United States Patent
Dartois

(10) Patent No.: US 6,289,056 B1
(45) Date of Patent: Sep. 11, 2001

(54) BROADBAND MULTICARRIER MODULATOR AND CORRESPONDING PROGRAMMING METHOD

(75) Inventor: Luc Dartois, Carrieres Sous Poissy (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/283,199

(22) Filed: Apr. 1, 1999

(30) Foreign Application Priority Data

Apr. 2, 1998 (FR) .................................................. 98 04104

(51) Int. Cl.⁷ .......................... H04L 27/04; H04L 27/12; H04L 27/20
(52) U.S. Cl. .......................... 375/295; 375/300; 375/303; 375/240
(58) Field of Search .................................... 375/295, 377, 375/240, 300, 303; 708/270, 271, 272

(56) References Cited

U.S. PATENT DOCUMENTS

| | | | | |
|---|---|---|---|---|
| 3,969,617 | * | 7/1976 | Fontanes ............................. | 708/270 |
| 4,562,426 | * | 12/1985 | Forney, Jr. ........................... | 375/240 |
| 4,686,688 | * | 8/1987 | Chung et al. ....................... | 375/274 |
| 4,710,891 | * | 12/1987 | Debus, Jr. et al. ................. | 708/270 |
| 5,379,242 | * | 1/1995 | Rose et al. ......................... | 708/300 |
| 5,420,887 | * | 5/1995 | Rhodes et al. ..................... | 375/295 |
| 5,430,711 | * | 7/1995 | Yamada et al. ..................... | 370/206 |
| 5,600,678 | * | 2/1997 | Petranovich et al. ............... | 375/298 |
| 5,712,878 | * | 1/1998 | Nemer ................................. | 375/303 |
| 5,903,609 | * | 5/1999 | Kool et al. ......................... | 375/261 |
| 5,945,885 | * | 8/1999 | Schwartz et al. ................... | 332/100 |

FOREIGN PATENT DOCUMENTS

| | | |
|---|---|---|
| 0 388 381 A1 | 9/1990 | (EP) . |
| 0 542 633 A1 | 5/1993 | (EP) . |
| 0 584 872 A1 | 3/1994 | (EP) . |
| 0 681 382 A2 | 11/1995 | (EP) . |
| 0 701 345 A2 | 3/1996 | (EP) . |
| WO 80/02900 | 12/1980 | (WO) . |

* cited by examiner

Primary Examiner—Stephen Chin
Assistant Examiner—Paul N Rupert
(74) Attorney, Agent, or Firm—Sughrue, Mion, Zinn, Macpeak Seas, PLLC

(57) ABSTRACT

In a broadband multicarrier modulator, all processing within a modulator is replaced by a pre-computed table so that a modulated signal can be produced as a function of the modulating signal merely by reading the table. The carrier frequency of the modulator is even programmable. The size of the pre-computed table is reduced by using an automation. With this automation the address for reading the table at a given time depends on preceding values of the modulating signal. By reading the table on a time sharing basis it is even possible, with a single modulator, to perform the work of several modulators. A multicarrier modulator is then easily implemented.

12 Claims, 7 Drawing Sheets

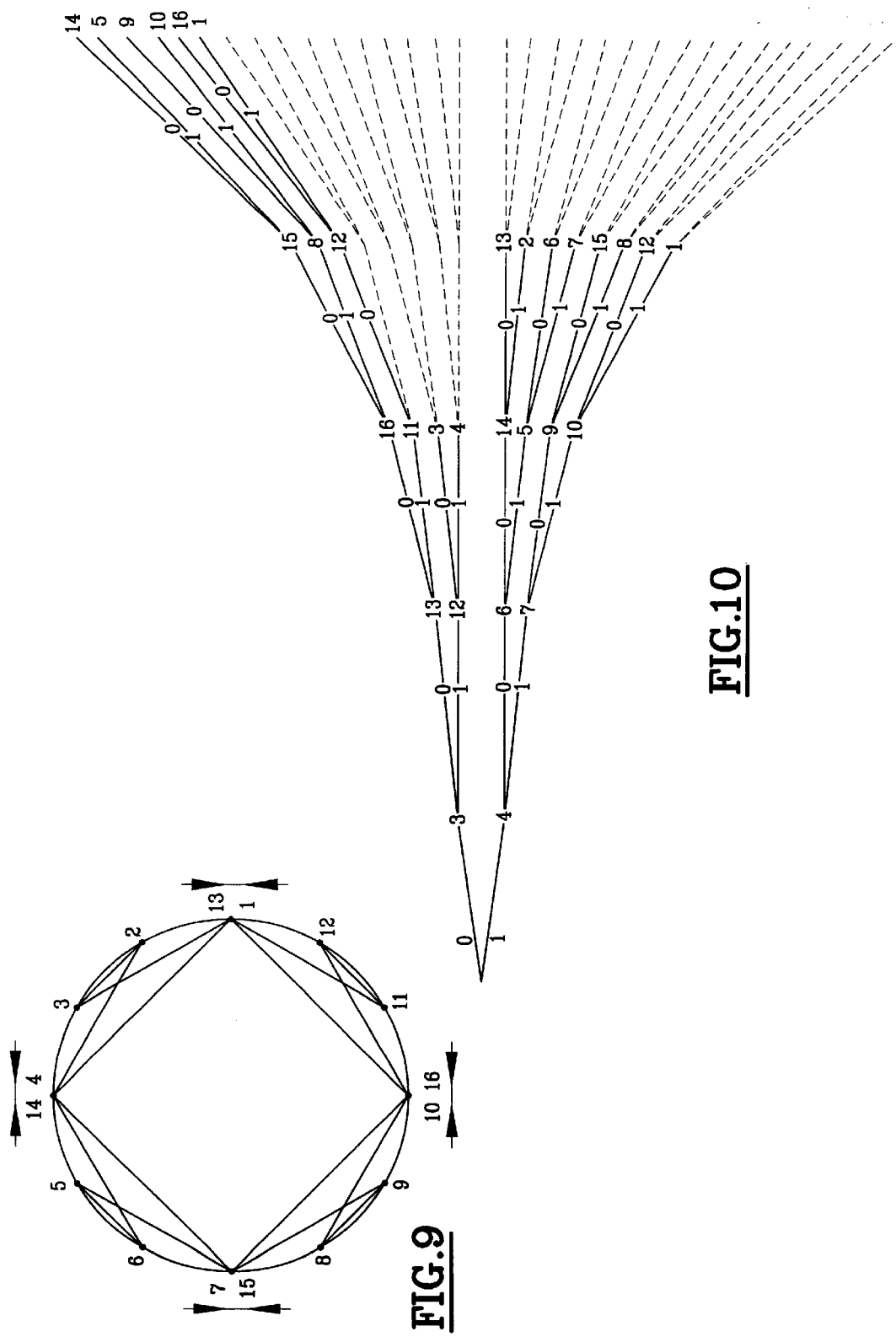

BROADBAND MULTICARRIER MODULATOR AND CORRESPONDING PROGRAMMING METHOD

BACKGROUND OF THE INVENTION

1. Field of the invention

The present invention concerns mobile telephones. It consists in a broadband multicarrier modulator that can be used in a base transceiver station or in a mobile telephone. In the latter case, the technique developed for the base transceiver station is used with advantage even though the modulator is not normally a multicarrier modulator. The invention enables a relatively large number of mobile telephones to be connected to the same base transceiver station. Generally speaking, the invention is beneficial if a plurality of modulator circuits must be able to modulate a plurality of carriers simultaneously. The invention also consists in a method of programming the multicarrier modulator.

2. Description of the prior art

The invention will be described in the context of a GSM type application but is not limited to that mode of use. Other protocols are equally feasible. The GSM has been chosen because it is sufficiently comprehensive and representative of the problems solved by the invention. FIGS. 1 to 5 show particular features of use of a base transceiver station in a GSM network. The operating constraints of the mobile telephones themselves will be deduced therefrom.

FIG. 1 shows geographical domains. The domains correspond to a district within a town, to a number of streets, for example. The contour of the domains is not necessarily as precise as the hexagons shown. In reality the contour of the domain corresponds to a physical limit beyond which signals transmitted at given frequencies from base transceiver stations within the domain are no longer received. Accordingly, a base transceiver station BTS in a first domain transmits signals on carriers F1 to F8. Other base transceiver stations in adjoining domains transmit on carriers F9 to F16, F17 to F24, F25 to F32, and so on. A further domain adjacent the domains adjacent the first domain could also use the frequencies F1 through F8 of the first domain to broadcast messages to mobile telephones therein. With this system there is little risk of signals getting mixed up.

FIG. 2 shows for one frequency F1 how a time frame (of 4.615 milliseconds duration) is used by eight users. The frame is divided into eight time windows. The users use the frequency F1 to transmit their signals in turn. The time windows have a duration limited to 577 microseconds. Another frequency F2 is used to broadcast messages relating to eight other users, and so on up to frequency F8.

Thus in practice 64 (8×8) users can be connected at the same time to the same base transceiver station in one domain. The time distribution of the windows within the frame is known as time-division multiple access (TDMA).

The carrier frequencies are switched at the end of each 4.615 millisecond frame to avoid problems associated with poor quality of propagation of the signal transmitted by a base transceiver station to a mobile on a given carrier (for example carrier F1). Users who were previously using frequency F1 can use another frequency F2. By circular permutation those previously using frequency F2 use frequency F3, and so on.

Eight frequencies from 64 have been retained for a domain in order to solve interference problems that could nevertheless arise between two non-adjoining domains, like those linked by the arrow in FIG. 1. Eight other frequencies from the 64 frequencies are used for the next frame. Those eight other frequencies are necessarily the same as the frequencies of the preceding frame. The principle is substantially the same but immunity to mixing of signals is increased.

FIG. 3 shows the amplitude of the signals transmitted in each of the bands and in each time window, depending on their use. It shows a modulation signal level for a user U1. Nothing is being transmitted for a user U2 who is silent. Another user U3 is far away from the base transceiver station. During an initialization window the base transceiver station recognizes that it is receiving from the user U3 at a low level. It then transmits at a higher level toward that user so that the user can receive their messages directly. The user then transmits a signal whose level corresponds to the effects of the distance from the base transceiver station. With a dynamic range of 30 dB, steps of 1 or 2 dB are adopted in practice, with the result that the level is quantified in terms of 15 or 30 values.

Moreover, although there is no signal being sent to user U2, there is a signal being sent to user U3. However, it is not feasible to increase the transmit level too sharply on passing from the time window of user U2 to that of user U3. In spectral terms, too sharp an increase will be interpreted as the presence of high-level interference frequencies. As shown here, the signal for user U3 is boosted using a substantially bell-shaped envelope to reduce the distortion that occurs in this situation. This neutralizes transmit periods at the beginning and end of the window. This is not a problem in practice because these periods are used for synchronization bits, in any case for bits with no message content.

FIG. 4 shows another constraint on the use of the modulators in the base transceiver stations. Frequencies F1, F4, F14, etc are used in a first frame t1. The bandwidth at each frequency is in practice 200 kHz. Under the GSM standard, what happens in one band must not have effects above a given level in an adjacent band (at a nearby frequency). In practice the standard requires that the signal transmitted in band F1 be attenuated at least 60 dB above 600 kHz, and therefore here in band F4. The bottom of FIG. 4 shows the spectrum of a filter required for a given frequency plan corresponding to a choice of eight frequencies from the 64 frequencies at the time of a given frame t1.

The main problem addressed by the invention is broadband multicarrier transmission. In particular, the invention seeks to generate a multiplicity of carriers which are modulated (F1, F4, F14) with high spectral purity in a given frequency band to feed a final transmit modulator and an amplifier. The problem is obviously particularly severe if the traffic level in the domain is high: if 64 mobile telephones are actually making calls in the domain at a given time.

In the base transceiver stations used at present a narrowband filtering technique is used to produce independent signals on each carrier. Each signal is therefore modulated, filtered and transposed in the analog domain before individual amplification and combination prior to transmission. In a few cases weak signals are combined before overall broadband power amplification.

The problem to be solved is that of finding a method and an architecture for a low cost multicarrier modulator receiving at its input various modulation signals (speech signals) and producing at its output an analytical signal representing the sum of the modulated carriers in the baseband or at an intermediate frequency. Each carrier must be present in the aforementioned sum with the spectral purity required by the constraints of the transmit interface. A posterior analog filtering of each channel is not possible in a broadband radio transmission system. To be satisfactory in applications where the same frequency is re-used the multicarrier modulator must also be able to receive a plurality of modulation signals to be superposed on the same carrier and to control the phase and amplitude of the carrier accordingly.

The usual problem encountered in digital methods is that of the number of operations effected, especially multiply and accumulate (MAC) operations on analytical numbers (complex numbers). The problem encountered with one carrier is obviously intensified if there is more than one carrier. The invention seeks to process simultaneously 64 carriers in a 25 MHz band with a sampling rate around 100 MHz, for example.

A prior art method of reducing digital MAC calculations transforms some of the operations into tabulations. In this case tables must be synthesized on the basis of modulation and filtering constraints. It is not obvious how to do this manually or even using conventional computer means, because of the size of the tables and the encoding load that this implies. What is more, the skilled person is still a long way from being able to do this independently of the modulation scheme and filtering constraints.

FIG. 5 summarizes current best practice in the field of multicarrier modulators. A signal that has previously undergone compression, redundancy, channel or other encoding is available in digital form. It is spectrally synthesized. An encoder receives the bits of the signal and, depending on preceding bits of the same signal (to simplify the example two previous bit times are considered here), produces encoded signals, symbols, resulting from linearizing the modulation over a time period equal to the duration of three bits. In an example to the GSM standard, the signal bits are delivered at a frequency of 13/48 MHz (substantially equal to 270 kHz). The encoder delivers the symbols at the same rate. A conversion table then delivers instantaneous frequency samples corresponding to the symbols produced by the encoder.

A phase accumulator connected to the conversion table therefore receives a signal proportional to the frequency. The accumulator adds a sample received to its content and returns the result to its input. The accumulator therefore produces an instantaneous phase. It is preferable to oversample the output of the phase accumulator by operating it at a significantly higher speed, for example in the range from 8 to 32 times its speed, rather than to have at the output of the phase accumulator only an instantaneous phase at the same rate as that at which the bits of the signal are produced. This means that the table converting symbols into frequency values and the phase accumulator are operated at 16×13/48=13/3 MHz, for example. The instantaneous frequency value is normalized to correspond to a phase difference that will occur during an oversampling period.

With this benefit of an instantaneous phase, signals corresponding to the instantaneous amplitudes of a modulating signal can be produced using sine and cosine transformation tables. All that then remains is to transform these instantaneous amplitude signals by means of digital-analog converters (DAC) and to feed them into the mixers to produce the signal to be transmitted. The mixers receive the signal from a local oscillator in phase quadrature. The signals produced by the mixers are then mixed in a third mixer which is also an amplifier. The amplifier is connected to an antenna to transmit the signal. The analog filtering previously considered is shown in FIG. 5 by a (narrowband) bandpass filter represented in dashed outline. Clearly a filter of the above kind is not feasible in a multicarrier modulator, especially if the spectral plan changes from one frame t1 to the other t2.

A frequency jump must be provoked using an adder to obtain a carrier Fi programmable from a signal at a frequency around zero. Intercollating the adder between the conversion table and the phase accumulator in order to superpose on each sample period the frequency of the carrier programmed at the instantaneous modulation frequency is known per se. This is shown with the adder, hopper, requiring the injection of a signal at a frequency F1 to F64 between the converter circuit and the phase accumulator.

Of course, to effect this addition without aliasing the oversampling rate must be greater than the maximum synthesized frequency. Here the maximum synthesized frequency is 26 MHz. This maximum frequency corresponds to 64 bands each of 200 kHz (i.e. 12.8 MHz) multiplied by 2 to satisfy the Nyquist criterion. An oversampling rate of 4 is chosen in this case and yields an oversampling frequency of 104 MHz. There is no simple way to provide a channel filter after synthesis because the frequency can change from one frame to another (see FIG. 2). The analog filter must be replaced by a digital filter to eliminate interference generated by modulation outside the wanted 200 kHz band.

With IIR type filters with 20 coefficients, phase distortion and computation dynamic range problems lead to 2080 million (104 MHz×20) complex multiplications and accumulations (MCMAC) per second. There is no phase distortion problem with FIR type filters but the computing capacity required is 54080 million real multiplications and accumulations (MRMAC). One CMAC operation is equivalent to four RMAC operations.

FIG. 5 uses dashed line frames to show that to combine a plurality of carriers simultaneously it is necessary to add signals produced by a plurality of modulator circuits before converting the result of the combination in a digital-analog converter and before modulating the signal from a local oscillator by the added signals in the phase quadrature mixers. Obviously eight modulator circuits would be required for the eight carriers, all oversampled at 104 MHz. There would then be eight filter operations, which would lead in this latter case to 432640 MRMAC. This type of filtering is virtually impossible at present because it would be too costly and would consume much too much power. In the current state of the art, digital signal processors are capable of only 400 MMAC per unit and consume one watt. This means that the power consumption for the eight channels would be 1 kW.

This is not at all competitive with an analog solution, even if particularly judicious integration were able to produce a saving by a factor of 4 to 10.

Also, implementing discrete computing elements would lead to a loss of efficiency, to a loss of power due to the many high-speed input-output interfaces that would be required between the various computing units. Clearly it is not feasible to step up to 32 or 64 carriers, as envisaged by the invention.

One aim of the invention is therefore to remedy the above drawbacks by limiting the cost and therefore the quantity of equipment used and the power consumed by the various circuits employed. Another aim of the invention is to render the multicarrier modulator integratable and modular by incorporating channel filters into the modulator.

The principle on which the invention is based is that of comprehensive tabulation of all possible complex trajectories of filtered signals that can be deduced from combinations of bits or symbols fed into the modulator.

The invention is based on the following observations: linear modulation has a finite number of states and transitions (possible signal trajectories during a period of one bit: symbol period). An FIR filter is equivalent to a finite state machine (also known as an automation or sequential system) if its response time is finite. Finally, a combination, cascade or convolution of two finite state machines remains a finite state machine but its complexity is the product of the initial two complexities.

Because the input modulation also has a finite number of states and transitions (for bit level modulation there are two possible states and therefore two possible transitions), the output of a GMSK (Gaussian Minimum Shift Keying) type linear modulator filtered a posterior by an FIR type filter has a finite number of states and trajectories corresponding to a bit period.

Accordingly, a state machine (or automation) can be constructed. A generic automation of the above kind is based on a table whose read address is partly based on the information read in a previous read operation. Also, there is only one trajectory signal for each new state or symbol.

Accordingly, even if the table is very large, there is a completely tabulated solution, i.e. a solution requiring no MAC type operations. As will emerge below, the modulator can be entirely implemented with two tables in cascade, one for producing future states at the end of the bit/symbol period and another, pre-computed, table called the trajectory table which produces directly the instantaneous signals to be transmitted. The trajectory table feeds a digital-analog converter connected to the mixers directly. It supplies fully processed signals, i.e. signals incorporating modulation, frequency hops and filtering. The tables of the automaton of the invention are significantly smaller than the tables previously referred to precisely because of the presence of the automaton.

Another feature of the invention is that the automaton produces arbitrary encoded states from the bit of the signal to be transmitted in order to simplify production of the pre-computed table. These arbitrary encoded states are then allocated to instantaneous signal values to be transmitted obtained by computation from the bit of the signal to be transmitted.

SUMMARY OF THE INVENTION

The invention therefore consists in a method of programming the automaton of a modulator, in particular for a mobile telephone network with base transceiver stations and mobile telephones, the modulator including a signal input, a modulator circuit in which a signal at the input modulates a carrier, and a transmit circuit for broadcasting the carrier by radio, the modulator circuit including:
- an automaton for producing an arbitrary encoded state for bits of the signal at the input and a preceding arbitrary encoded state of the automaton, and
- a pre-computed table for transforming the arbitrary encoded state into an instantaneous signal that is fed into the transmit circuit,
in which programming method:
- the evolution of an ideal modulator for a given type of modulation and for different configurations of bits of the input signal is simulated and trajectories are produced as output signals of the modulator,
- modulation state references and trajectory references are allocated arbitrarily to the configurations,
- an automaton is constructed by allocating the references in one table to an address of a record of the automaton and assigning the trajectories in another table to an address corresponding to the trajectory references, and
- an arbitrary state corresponds to a preceding configuration of the input signal modified by the value of the bit of the input signal.

The invention also consists in a modulator obtained in the above manner.

The invention will be better understood on reading the following description and referring to the accompanying drawings which are given by way of illustrative example only and are in no way limiting on the invention.

BRIEF DESCRIPTION OF THE DRAWINGS

FIGS. 9 and 10 show phase trajectories in a previous example of modulation.

DETAILED DESCRIPTION OF THE PREFERRED EMBODIMENT

Figure 5:
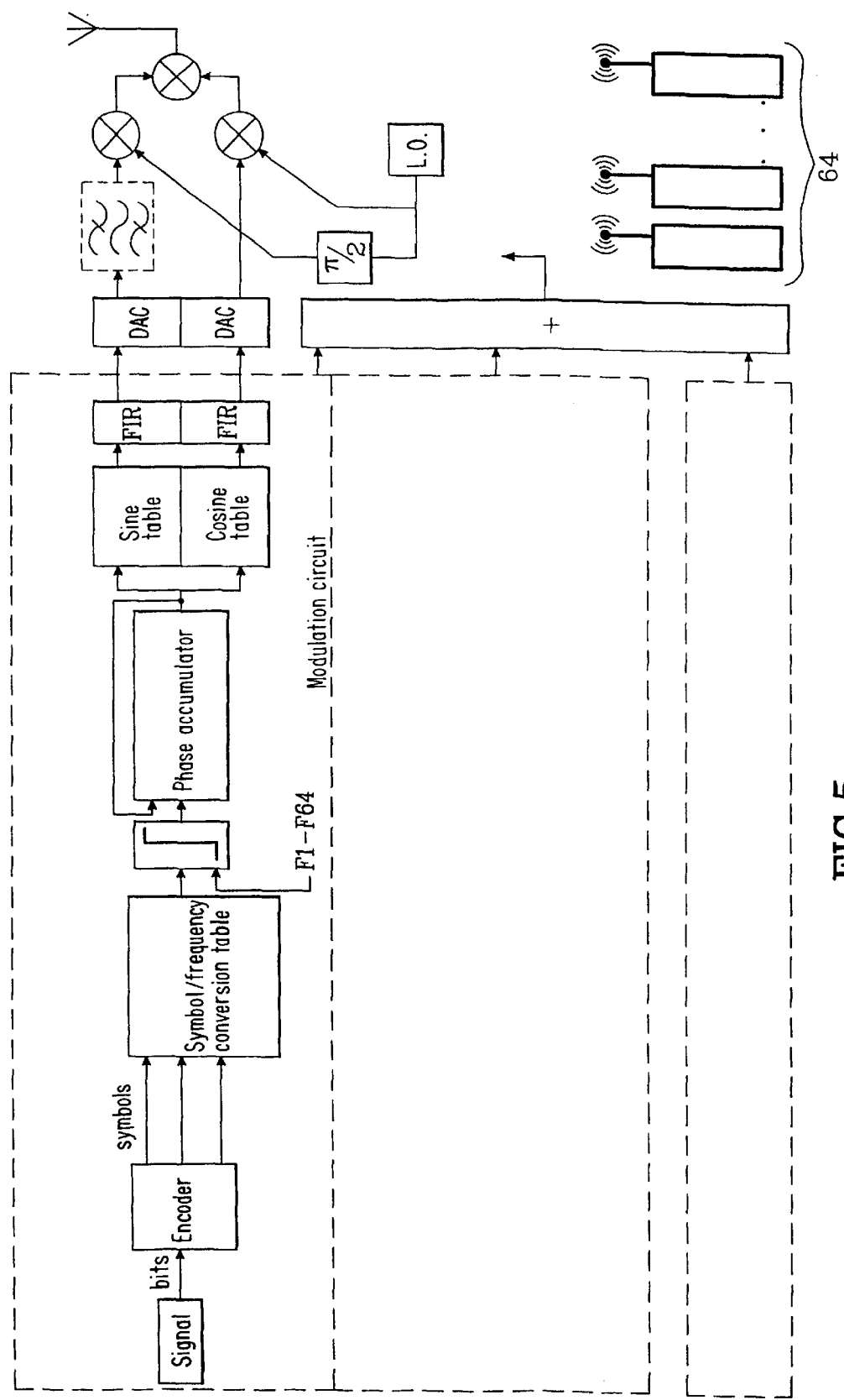
FIG. 5 is a block diagram illustrating current multi-carrier modulators.
Figure 6:
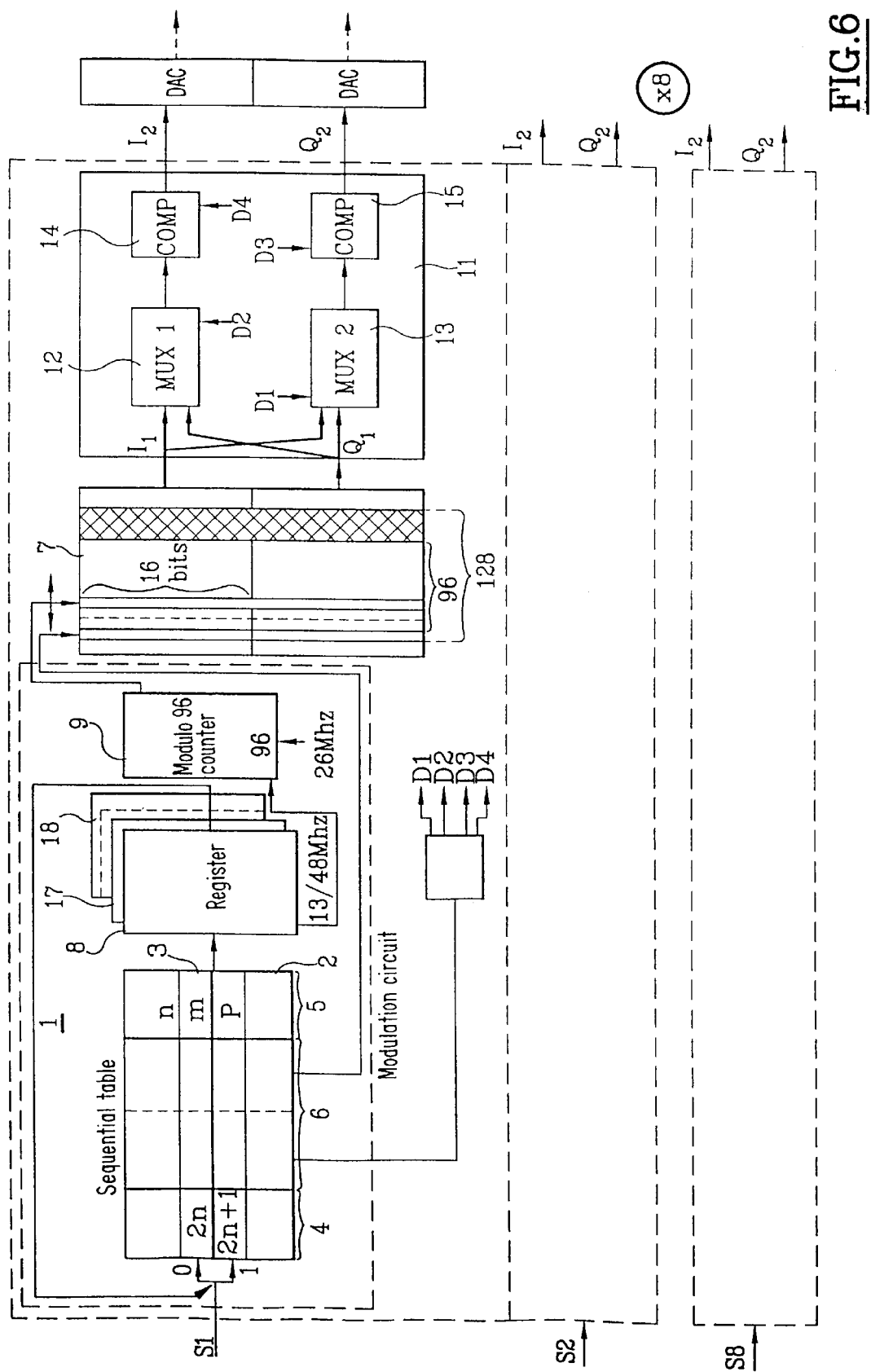
FIG. 6 shows a modulation circuit included in a modulator circuit of the invention.
Figure 7:
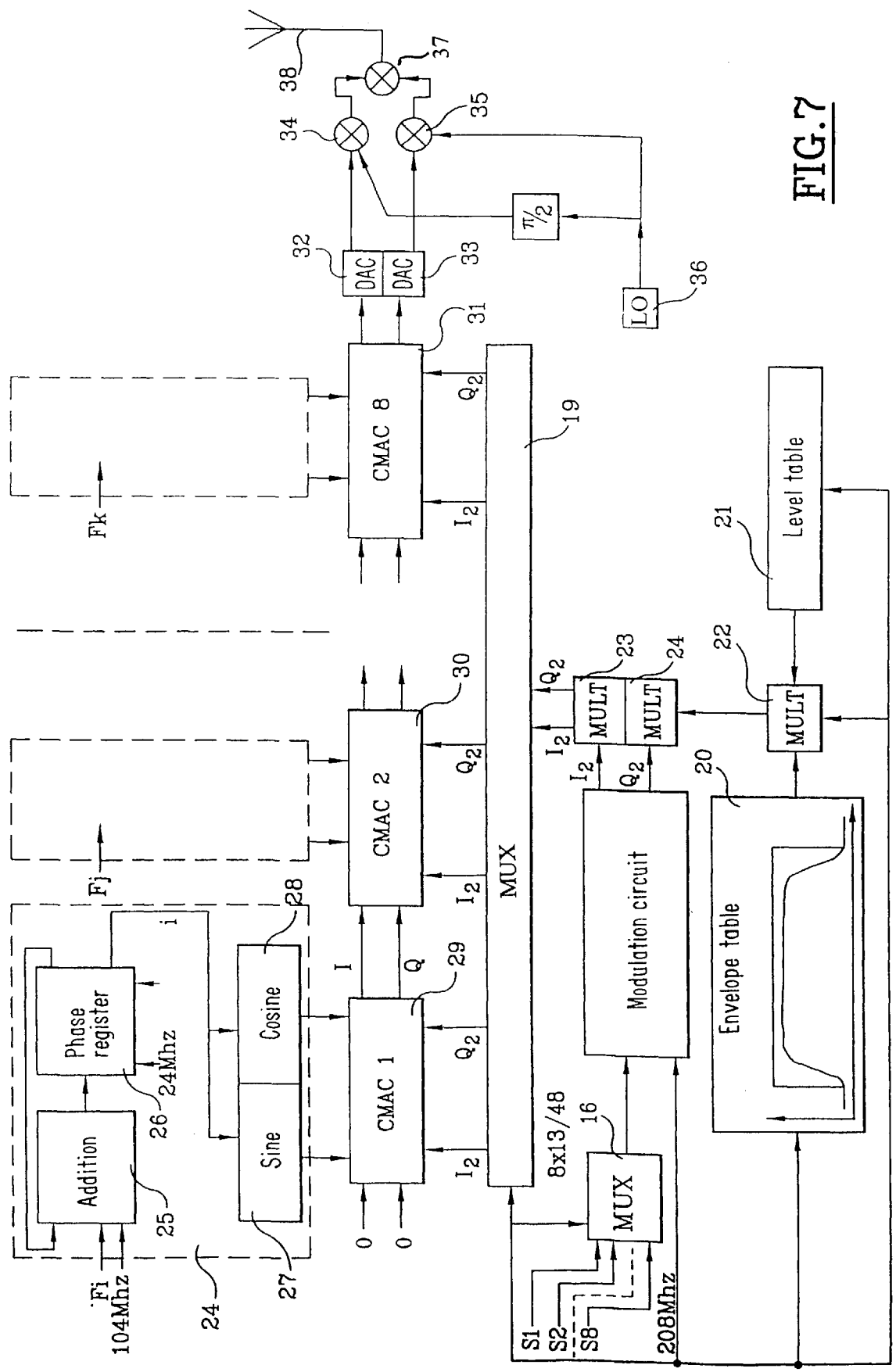
FIG. 7 shows one particular embodiment of the modulator circuit of the invention with a single modulation circuit as shown in FIG. 6.

FIG. 6 shows a modulation circuit comparable to that from FIG. 5 which can be used in a modulator circuit in accordance with the invention in a base transceiver station. The modulation circuit receives a signal, here a signal S1, and transmits it in a form 12 Q2 to a transmit circuit. The transmit circuit can combine different carriers and broadcast them by radio. FIG. 7 shows a preferred manner of combining carriers. The modulation circuit, and therefore the modulator circuit of the invention, essentially include an automaton 1 that produces arbitrary encoded states from bits of a signal to be transmitted (signal S1) and a preceding arbitrary encoded state delivered by the automaton. The fact that the states memorized in the automaton 1 are arbitrary states is related to the mode of production of a correspondence table 2 to be used in the automaton 1 (see below).

The table 2 includes records such as the record 3. Each record is at an address 4 and includes a certain number of information bits. In one example two fields are recorded in each record. A first field in area 5 of table 2 includes states. A second field in area 6 of table 2 includes trajectory references. In one example the field in area 5 comprises 9 bits and can therefore designate 512 different states. The states are arbitrary states. The arbitrary nature of the states is imposed not by any relationship with the values of the bits of signal S1 or another signal but simply by the manner in which table 2 is produced using the algorithm shown in FIG. 8 (see below). The arbitrary states stored in column 5 are associated with trajectory references that are also arbitrary and are encoded on 9 bits. The arbitrary trajectory references also constitute information unrelated to the values of the bits, relating only to the manner in which a pre-computed conversion table 7 is produced (see below).

The trajectory references are used as addresses to access the trajectories in the pre-computed table 7. The pre-computed table 7 converts an arbitrary encoded trajectory reference available in column 6 into an instantaneous signal 11 or Q1, 35 where applicable 12 Q2, that is introduced into the transmit circuit. The records in table 7 preferably comprise two words. In one example each word comprises 16 bits. Each record therefore corresponds to the two components in quadrature of the instantaneous amplitude. The instantaneous signal obtained in this way is fed into the transmit circuit.

The automaton operates as follows: at a given time, an arbitrary encoded state n has been read in column 5 of table 2. This state was previously stored in an intermediate register 8. This state, combined afterward with the value of the signal S1 (which is 0 or 1) is used to address table 2 again, at an address 2n or 2n+1 according to the value of S1. In other words, for each value of n found there are two candidate records in table 2 and one of these two records is chosen according to the bit value of signal S1.

In the example, selecting address 2n would lead to another arbitrary encoded state m (totally unrelated to n, at least a priori), whereas selecting the line at address 2n+1 would lead to detection of the arbitrary encoded state p.

In GMSK type modulation, with a horizon on three bit periods, it is necessary to be able to filter the instantaneous signals produced using an FIR filter. This filter has a memory effect equivalent to at least five bit periods. This therefore amounts to cascading either two automata as previously referred to with three and five bit periods or a single one as shown in the example. This means that the single automaton then has a horizon of eight bit periods (an eight bit memory). Allowing for the input bit of signal S1, $2^{8+1}=512$ possible trajectories are obtained. This is why the arbitrary states and arbitrary trajectory references are coded on 9 bits. They correspond to 512 different situations. Table 2, and therefore register 8, is read at a rate equal to 13/48 MHz per channel: at the rate of the bits of signal S1.

FIG. 6 shows two improvements on the invention.

A first improvement concerns the introduction of a modulo 96 counter 9. The counter 9 interpolates a greater number of trajectories than would be obtained at the 13/48 MHz rate. To this end the counter 9 is timed by a frequency 96 times higher than the bit frequency of signal S1.

In other words, the counter 9 is reset to zero each time a bit of signal S1 is read and tuns through 96 positions before the next reading of a bit of signal S1, its next resetting to zero. Table 7 then contains 512×96 addressing locations. However, because 96 is not an integer power of 2, it is preferable to use partitions of 128 consecutive addresses in table 7 for each trajectory addressed by the automaton 1. 32 addresses are neutralized in each partition. The 32 neutralized addresses are shown by the shaded area. Table 7 therefore includes 512×128 records instead of the 512×96 wanted records.

Accordingly, a first address is read from table 7 for each arbitrary trajectory read in area 6 of table 2. 95 other successive addresses are then read at the rate of the counter 9 before moving on to another arbitrary trajectory. Because of this memory distribution, the address actually looked up in memory 7 for an arbitrary trajectory reference n produced by column 6 is 128 n+i (i running from 0 to 95). To perform this multiplication by 128 it is sufficient to shift the address value nine steps toward the more significant address bits so as to arrive at the beginning of the series of 96 wanted positions. The signals delivered by the counter 9 constitute the less significant address bits of the records in memory 7.

FIG. 6 also shows a second improvement on the invention. This allows for natural symmetries of the instantaneous signals. The instantaneous signals are circular components of constant radius identified only by the phase. There is therefore I and Q symmetry: sine and cosine symmetry about $\pi/2$, $\pi$, $3\pi/2$, $2\pi$. The counter 9 can count up or down (see below).

This amounts to storing eight times less information in table 7. The table can then be eight times smaller.

To simplify counting in an oversampling partition and to allow for the symmetry of counting it is preferable if the counter 9 is centered on 64, rather than counting from 1 up to 96 and discarding positions 96 to 128 of memory 7. It then counts up values 16 to 111 or counts down values 111 to 16. It is therefore sufficient to shift all of the record in memory 7 sixteen steps relative to the start address.

Thus a smaller address and symmetry information can be produced from the arbitrary trajectory reference available in column 6 of table 2. The symmetry information is used to modify into the 12 Q2 form the 11 Q1 values read in table 7 at the smaller address. The symmetry information comprises four signals DI to D4. Signals D1–D4 control a complex multiplexer 11 interpreting instantaneous 11 Q1 signals read in memory 7.

The complex multiplexer 11 includes two multiplexers 12 and 13 each receiving the 11 and Q1 signals on each of their two inputs (but interchanged from one multiplexer to the other). The multiplexers 12 and 13 are controlled by signals D1 and D2. The multiplexers 12 and 13 are connected to respective 2's complement circuits 14 and 15. The 2's complement circuits 14 and 15 receive signals D3 and D4 as control signals. The 2's complement operation amounts to delivering at the output the inverse of the I or Q signal at the input. This can also be simplified subsequently by replacing the 2's complement circuit with a 1's complement circuit that requires only an exclusive-OR gate instead of a half-adder.

This technique has a disadvantage which is a one step translation toward the more significant bits of the trajectory, which leads to interference at a multiple of the bit time and at a level substantially equal to −92 dBC. This can be avoided by translating the encoding or rounding I and Q by half the least significant bit.

This makes table 7 eight times smaller or, for a table the same size, provides a horizon of filters used in the filter function that it implements with three additional bit times.

Filtering will then be of much better quality.

Good channel filtering, enabling a spacing of 400 kHz, for example, i.e. −40 dB rejection of interference at 400 kHz, requires a posterior FIR filtering with 384 coefficients. This corresponds to a memory duration of five bit times. Under these conditions, with 512 imposed trajectories in column 6, table 2 contains 512 double words of 9 bits, i.e. 9.216 bits to define the arbitrary state and the arbitrary trajectory. Table 7 contains 512×128 double words of 16 bits, which is 2 Mbits, since I and Q are both encoded on 16 bits. If the memory size is reduced by a factor of 8, a memory 7 of 256 kbits (32 kbytes) results, rather than 2 Mbits.

To simplify the explanation it is assumed that the modulation circuit shown in FIG. 6 is implemented eight times to produce eight series of signals 11 and Q1 (before the multiplexer 11, or signals 12 Q2 after the multiplexer 11). However, a different approach is preferable, as embodied in a third improvement shown in FIG. 7.

The modulation circuit in a base transceiver station is supplied with a signal from a multiplexer 16. The multiplexer 16 receives the various signals S1 to S8 to be transmitted to the mobile. In the GSM standard 156.25 bits are produced in a 577 microsecond window at the GSM modulation frequency of 13/48 MHz. It is then possible to control the multiplexer 16 with a control signal eight times faster than the GSM modulation frequency. If this is done, the multiplexer 16 will cyclically scan at very high speed each of the eight inputs and deliver all the signals transmitted in the eight frequency bands (F1, F4, F14) to the output during the same time window, in 156 bursts each of 8 bits.

Under these conditions the automaton 2 from FIG. 6 must be modified. In particular, the register 8 is duplicated eight times in registers 17, 18 in order to be able to represent at the addressing input of table 2 the arbitrary state corresponding to each of the channels considered (F1 to F64) for the next burst. The register 8 and the other registers 17and 18 are of course scanned eight times faster, at 8×13/48 MHz. This enables the same table 2 to be retained, however. In practice, the frequency of 8×13/48 MHz is synthesized from a 208 MHz clock signal.

Also, instead of running the counter 9 at 26 MHz (i.e. 96 times faster than the GSM modulation frequency) it is made to work at a frequency eight times higher: 208 MHz. A frequency of this magnitude is entirely feasible in the current state of the art, so this solution is preferred because the modulator can then be made as one unit, like that shown in FIG. 6, rather than eight units as the figure would suggest.

Of course, the signals 12 and Q2 at the output must be fed into a multiplexer 19 to separate them before they are passed to a general modulator.

Figure 1:
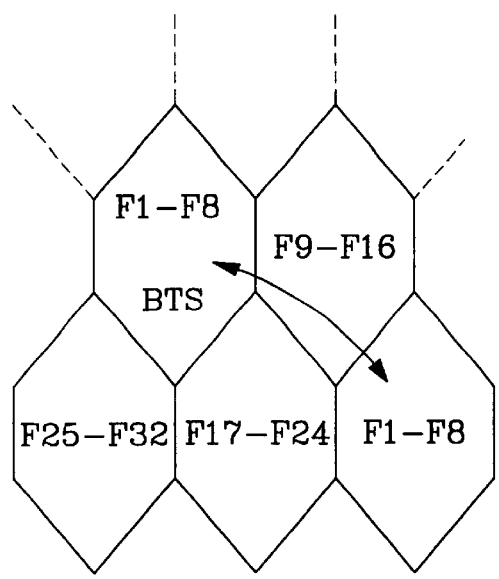
FIG. 1 is a diagrammatical illustration of geographical domains.
Figure 2:
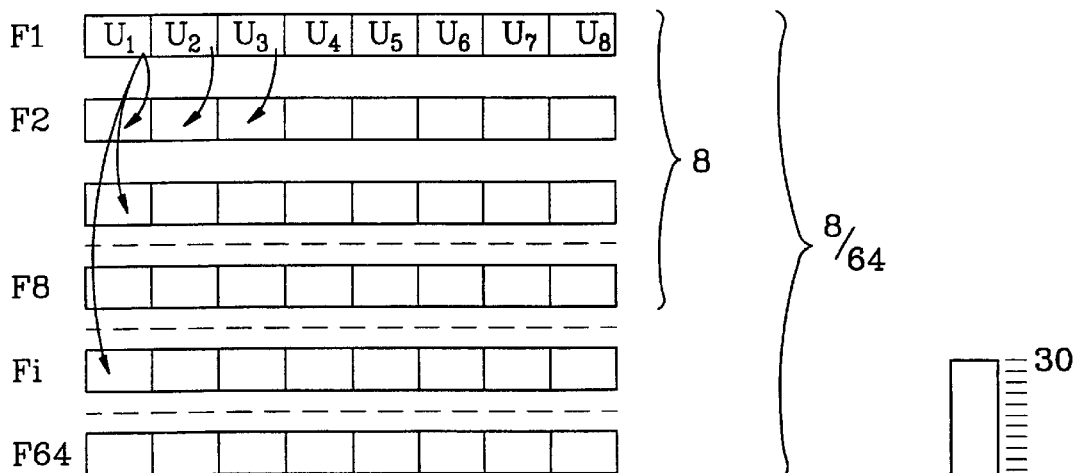
FIG. 2 diagrammatically illustrates the manner in which a time frame is used by eight users.
Figure 3:
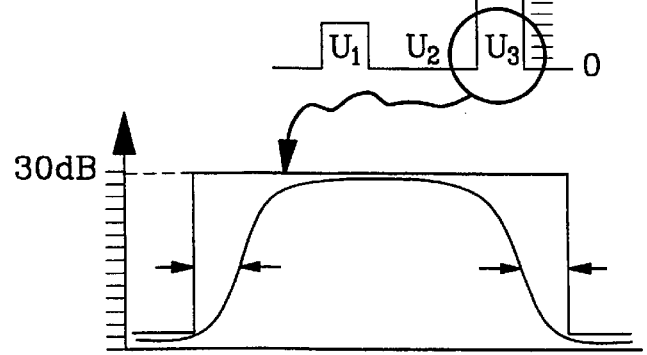
FIG. 3 is a graph illustrating the amplitude of signals, transmitted in each band and each time window, depending on their use.
Figure 4:
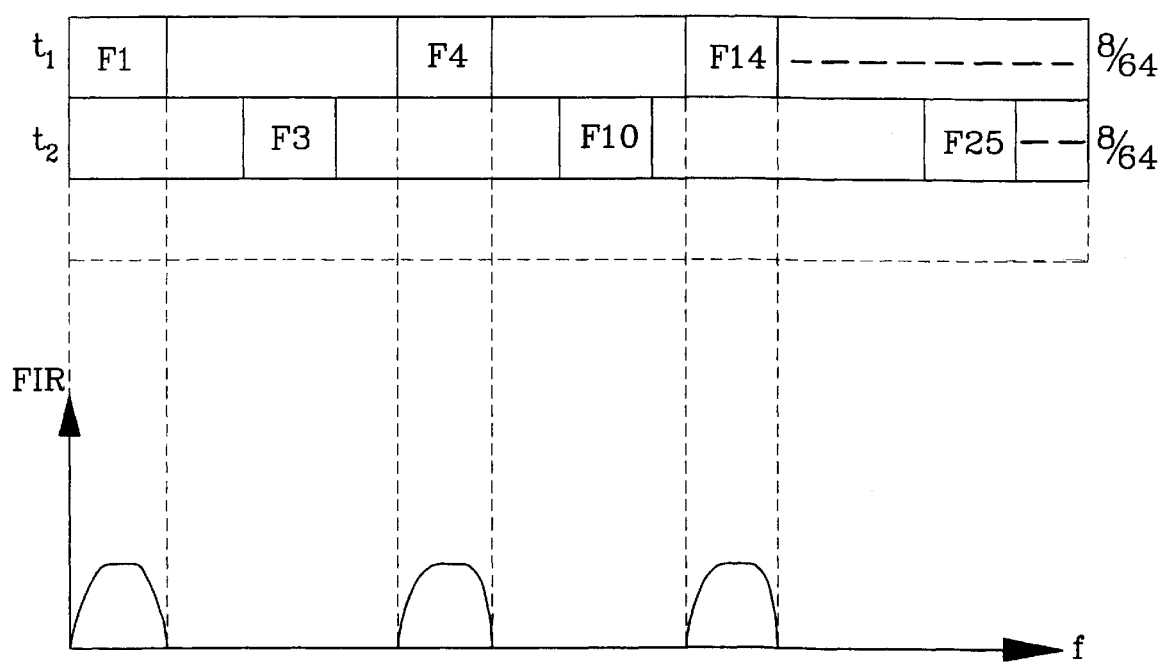
FIG. 4 graphically illustrates a constraint on the use of modulators in base transceiver stations.

FIG. 7 shows an embodiment of a general modulator in which eight modulators are connected in cascade. A different architecture could be used, however, for example one of the type shown in FIG. 4. A control signal at 208 MHz is shown in the FIG. 7 modulation circuit. The 208 MHz control signal also controls the multiplexer 19, of course. The control signal for the multiplexer 16 is deduced from the 208 MHz control signal. The 208 MHz control signal also controls an envelope 20 and a level table 21. The envelope table 20 and the level table 21 carry out the adaptations envisaged in FIG. 3. In other words, the level increasing in proportion to the distance of the user, the level at which a signal must be transmitted for a given user is multiplied by the time envelope that has to be given to the rise time of the signal in the time window. This is brought about by a multiplier 22. The envelope table 20 can be the same, accessed eight times in succession in each burst to read the instantaneous rise time. Reading of table 20 is synchronized with the start and the end of the time windows. The level table 21 contains eight levels imposed by the distances of users U1–U8. It is read cyclically at 208 MHz.

Signals 12 and Q2 are then multiplied in respective multipliers 23 and 24 by the output of the multiplier 22. This provides signals 12 and Q2 that can really be used as instantaneous signals. The instantaneous signals modulate carriers at frequencies Fi, Fj or Fk, eight frequencies of the 64 frequencies (see below).

A single digital-to-analog conversion is preferably performed on all of the modulating signal, just before transmitting the signals to be transmitted. Before this, all processing is digital. With this in mind, the oscillators generating the sub-carriers are digitally controlled oscillators like the oscillator 24. An oscillator 24 of this kind includes an adder 25 and a phase register 26 looped to one input of the adder 25. Another input of the adder 25 receives a digital signal representative of a given frequency Fi. As with the phase accumulator from FIG. 5, feedback produces an instantaneous phase. The higher the frequency of the signal Fi, the faster the instantaneous phase rotates. The frequency Fi can take values from 0 to 26 MHz, for example. The choice of the 26 MHz oversampling frequency for the modulator and the frequency of 104 MHz for producing the sub-carriers is connected with the requirement to have a multiple common to the bit rate (13/48 MHz) and to the channel spacing (200 kHz).

This leads to perfectly synchronized generation without phase errors and with a limited number of phase states. In one example there are 1 040 phase states (104/0.1=1 040). The instantaneous phases are then converted in the sine and cosine tables 27, 28 into quadrature components of the amplitude of the programmed sub-carrier. With 1 040 phase states, this yields small trigonometric tables. The only remaining error in this mode of production of the local oscillator wave consists in interference in the 104 MHz band. It results from amplitude quantizing noise. This is estimated to be less than −98 dBC for samples on 16 bits. The adder 25 is an 11-bit adder.

The phase register 26 includes a subtractor which subtracts 1 040 each time the adder passes through the value 1 040. The initial phase of the digitally controlled oscillator can be varied for the carrier in the register with a resolution of $2\pi/1\,040$, which is substantially 0.350. A single table is obtained rather than two tables 27 and 28 because of the sine and cosine symmetries (I and Q respectively) for the signals produced by the phase register 26 and because a frequency of 208 MHz is available. To produce the sine, the single table is addressed by the phase $-\pi/2$, that is to say −1 040/4.

The signals delivered by the tables 27 and 28 or the single table read twice as fast are fed with the previous signals 12 and Q2 into a complex multiplication (CMAC1) circuit 29. The complex multiplication circuit 29 therefore produces two signals I and Q corresponding to the signal to be transmitted. The CMAC circuits therefore effect product modulation.

In one particularly beneficial variant of the invention CMAC complex modulation circuits 29, 30 and 31 are connected in cascade. The inputs of the CMAC multipliers are the outputs of the modulation circuit and the oscillator of the stage concerned. The multiplication result is added to a third input of the multiplier, which corresponds to an output of a preceding multiplier, to deliver the multiplier output signals I and Q. Thus each CMAC circuit receives from the multiplexer 19 the signals 12 Q2 corresponding to a modulation channel. It also receives the sine cosine signals produced by the tables 27 and 28 of the corresponding digitally controlled oscillator. It finally receives the signals I and Q from an upstream CMAC circuit. The first (most upstream) CMAC circuit receives 0 and 0 on these latter inputs. Under these conditions the last CMAC circuit 31 delivers the signals to be transmitted.

Finally, the signals to be transmitted are then converted by the analog-digital converters 32 and 33. The signals delivered by the analog-digital converters are instantaneous amplitude signals whose evolution is representative of the final modulation. These signals are applied to two mixers 34 and 35 in quadrature receiving a signal delivered by a local oscillator 36. In the GSM, for example, the frequency of the local oscillator is in the order of 900 MHz. In the DCS it is 1 800 MHz and in the PCM it is 1 900 MHz. The signals delivered by the two mixers 34 and 35 are then introduced into a mixer 37 before optional amplification and broadcasting via an antenna 38.

Any filtering and amplification between the converters 32 and 33 and transmission are of conventional type.

Figure 8:
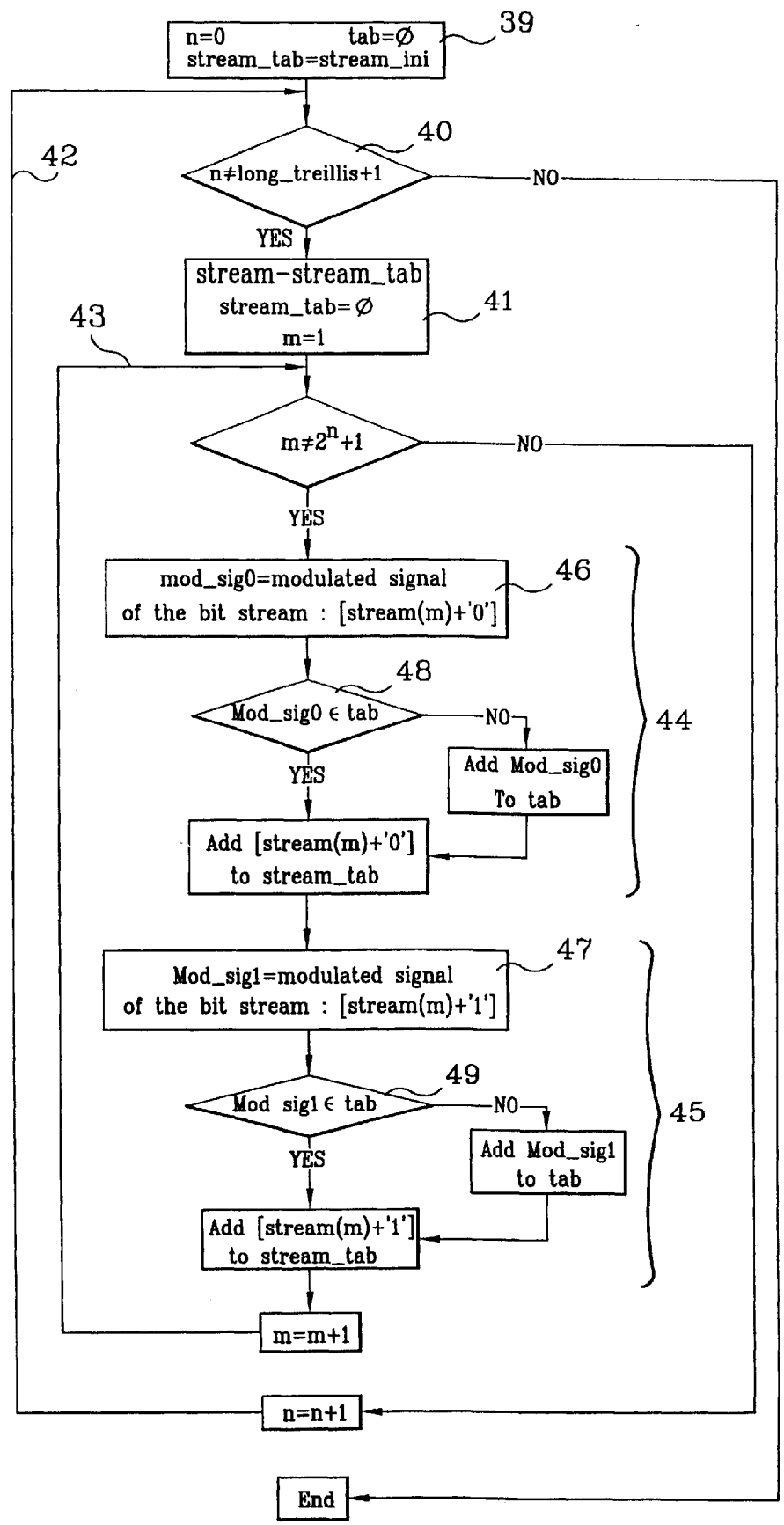
FIG. 8 shows an algorithm that can be used to produce the trajectory table and the automaton table.

FIG. 8 shows how tables 2 and 7 of the invention are filled in. In a first step 39 the rank n is zero and the tables are empty. Given the foregoing description, the number n must be less than the length of the trellis +1 (in practice it must be less than 513). A test 40 determines whether n is less than 513. Either the procedure continues or the operation is terminated. Under these conditions, starting values for variables stream, stream_tab and m are fixed in a step 41.

The principle of the program from FIG. 8 is to produce the names, the references of the new arbitrary states and of the new arbitrary trajectories starting from those previously allocated, following synthesis and filtering by analytical computation means. It also computes the pre-computed values from table 7. An external loop 42 is therefore executed N times. N is the length of the trellis needed to run through all possible states and trajectories comprehensively.

An internal loop 43 computes the 2p new states and trajectory references for each new incoming bit value 0 or 1. The internal loop 43 includes two comparable sequences 44 and 45 related to the 0 or 1 state of the incoming bit. Step 46 or 47 computes the simulated trajectory for each new state (a state is an I and Q pair corresponding to a sample at the start of the bit time period). This is followed by comparison with all steps already obtained since the start of the external loop 42 (step 48 or 49). If the state is new it is added to the state prediction table 2 with an arbitrary code incremented by 1. If the state exists already, the next step of the internal loop is not executed. For each pair associating a state known already and a new bit value a corresponding new arbitrary state code is written in the table. On the next iteration of the external loop only the new states encountered are stored.

A new trajectory is computed in the internal loop for each extension of the number of states, with 0 or 1. The trajectory is compared with all trajectories already encountered since the start of the external loop. This comparison allows for the eight possible symmetries. If a trajectory is new it is added to the trajectory table as a reference for a new class, with an augmented class code. A symmetry code (signals D1–D4) is added in the fields of table 2. If the trajectory exists already in the table the corresponding code is used and the symmetry code is computed. Both are also placed in fields 6 of the prediction table.

To be in a position to exploit the symmetries, the original state for entering the external loop must be chosen in a quadrant, for example, with a modulation past corresponding to more bits. Another, blind, method is to provoke an initial loop with generations of trajectories and states that are sufficiently long to enter a stable mode of the filter. A sequence of 10 bits is used, for example: five plus the length in bit times of the FIR filter.

The states of the transitions, where the symmetries can be found, and the corresponding extensions of the array effected in the program are shown in FIGS. 9 and 10, respectively, by way of example. This example applies to GMSK type modulation linearized on 3 bits without filtering. This is to simplify the diagrams. However, the principle is exactly the same with more modulation states and an a posteriori long filter (512 states instead of 16).

The modulation path is appropriate to an adopted modulation. For a given modulation, for example that shown in FIG. 9, starting from a given state, for example arbitrary state 1, a computation program simulates the instantaneous phase that a modulation circuit like that from FIG. 5 must deliver. In particular, the oversampled instantaneous values available at the output of the phase accumulator are evaluated. These instantaneous values are subjected to mathematical FIR filtering with a filter horizon chosen in advance. The filter chosen is a filter with which it is deemed to be possible to comply with the filtering constraints of the applicable norm. Note that a very precise filter can be chosen because these are preparatory calculations. The only constraint affecting the choice of the filter is the length of its time horizon, which is related directly to the number of trajectories that must be held in memory.

This produces the filtered instantaneous values to be stored in memory 7 at an address corresponding to the arbitrary trajectory reference attributed to the starting state. The starting state is then made to evolve by simulating the arrival of a new bit at 0 and then a new bit at 1. The arbitrary states 2 and 4 shown in FIG. 9 are obtained. The corresponding filtered instantaneous values are computed for these two arbitrary states in the same fashion. And so on, for all possible states. The possible states depend on the modulation adopted. In a simple example shown in FIG. 9 the states are represented by a phase 0, $\pi/6$, $2\pi/6$, $\pi/2$, etc. In this example it is possible to determine whether each state is new in a simple manner, by looking to see if the phase attained and the starting phase have already been encountered.

The advantages of the solution in accordance with the invention are: integratability and better use of the technology—a reduction of cost by a factor of 8 because only one of eight modulators is implemented—a saving by a factor much greater than 100 in the number of MRMAC compared to conventional approaches the modularity of the modulators and the transposer circuits (a principle which is not limited in terms of numbers of carriers)—the possibility to generalize the solution to any linear or linearized modulation, i.e. a finite number of states, post-filtered by a finite impulse response filter. The modulation can be phase, amplitude, frequency or constellation modulation or any combination giving a finite number of states when they are sampled at a bit frequency. The implementation is general and does not depend on the form of the filter. It depends only on the maximum length of the filter. Also, there is no constraint as to the length of the filter except the size of the memories.

The memories 2 and 7 are preferably dynamic or static RAM or programmable non-volatile memory, for example EPROM or EEPROM.

The invention can also be used for the mobiles. For these it assures a better phase trajectory and better elimination of adjacent channel interference. This could allow a spacing of 400 kHz in the uplink connections from the mobiles to the base transceiver stations, for example.

What is claimed is:

1. A method of programming the automaton of a modulator, in particular for a mobile telephone network with base transceiver stations and mobile telephones, said modulator including a signal input, a modulator circuit in which a signal at said input modulates a carrier, and a transmit circuit for broadcasting said carrier by radio, said modulator circuit including:

an automaton for producing an arbitrary encoded state for bits of said signal at said input and a preceding arbitrary encoded state of said automaton, and a pre-computed table for transforming said arbitrary encoded state into an instantaneous signal that is fed into said transmit circuit, in which programming method:

the evolution of an ideal modulator for a given type of modulation and for different configurations of bits of said input signal is simulated and trajectories are produced as output signals of said modulator, modulation state references and trajectory references are allocated arbitrarily to said configurations, an automaton is constructed by allocating said modulation state and trajectory references in one table to an address of a record of said automaton and assigning said trajectories in another table to an address corresponding to said trajectory references, and an arbitrary state corresponds to a preceding configuration of said input signal modified by the value of the bit of said input signal.

2. A modulator obtained by means of a programming method as claimed in claim 1.

3. The modulator claimed in claim 2 wherein said modulator circuit includes an oversampling counter for progressively producing multiple instantaneous signals for each arbitrary encoded state at the rate of said counter.

4. The modulator claimed in claim 3 wherein said pre-computed table includes a number of addresses that is a multiple of $2^n$ that can be used for instantaneous signals corresponding to an arbitrary encoded state and said oversampling counter does not produce a number of different states that is a multiple of $2^n$.

5. The modulator claimed in claim 2 wherein said modulator circuit includes a multiplexer for modifying instantaneous signals read in said pre-computed table in accordance with bits of said arbitrary encoded state.

6. The modulator claimed in claim 2 wherein said automaton includes an input multiplexer for receiving a plurality of different input signals successively and a set of registers for storing preceding arbitrary encoded states corresponding to each of said different input signals and said transmit circuit includes a plurality of circuits for combining carriers corresponding to each of said input signals.

7. The modulator claimed in claim 6 characterized in that the transmit circuit includes a set of complex digital multipliers receiving as first operands carrier signals delivered by a set of digitally controlled oscillators and as second operands the instantaneous signals corresponding to the input signals and producing signals to be transmitted.

8. The modulator claimed in claim 7 wherein said modulator circuit includes an output multiplexer connected to the second operand inputs of said complex digital multipliers.

9. The modulator claimed in claim 7 wherein said complex digital multipliers are cascaded three-operand multipliers and receive as third operand the result from a preceding cascaded complex digital multiplier.

10. The modulator claimed in claim 9 wherein said complex digital multipliers are connected to digital-analog converters connected to a broadcast circuit.

11. The modulator claimed in claim 2 wherein said pre-computed table corresponds to linear or linearized modulation, i.e. modulation with a finite number of states, post-filtered by a finite impulse response filter.

12. The modulator claimed in claim 11 wherein said modulation is reprogrammable and said tables are of the RAM, EPROM or EEPROM type.

* * * * *